Figure 1:
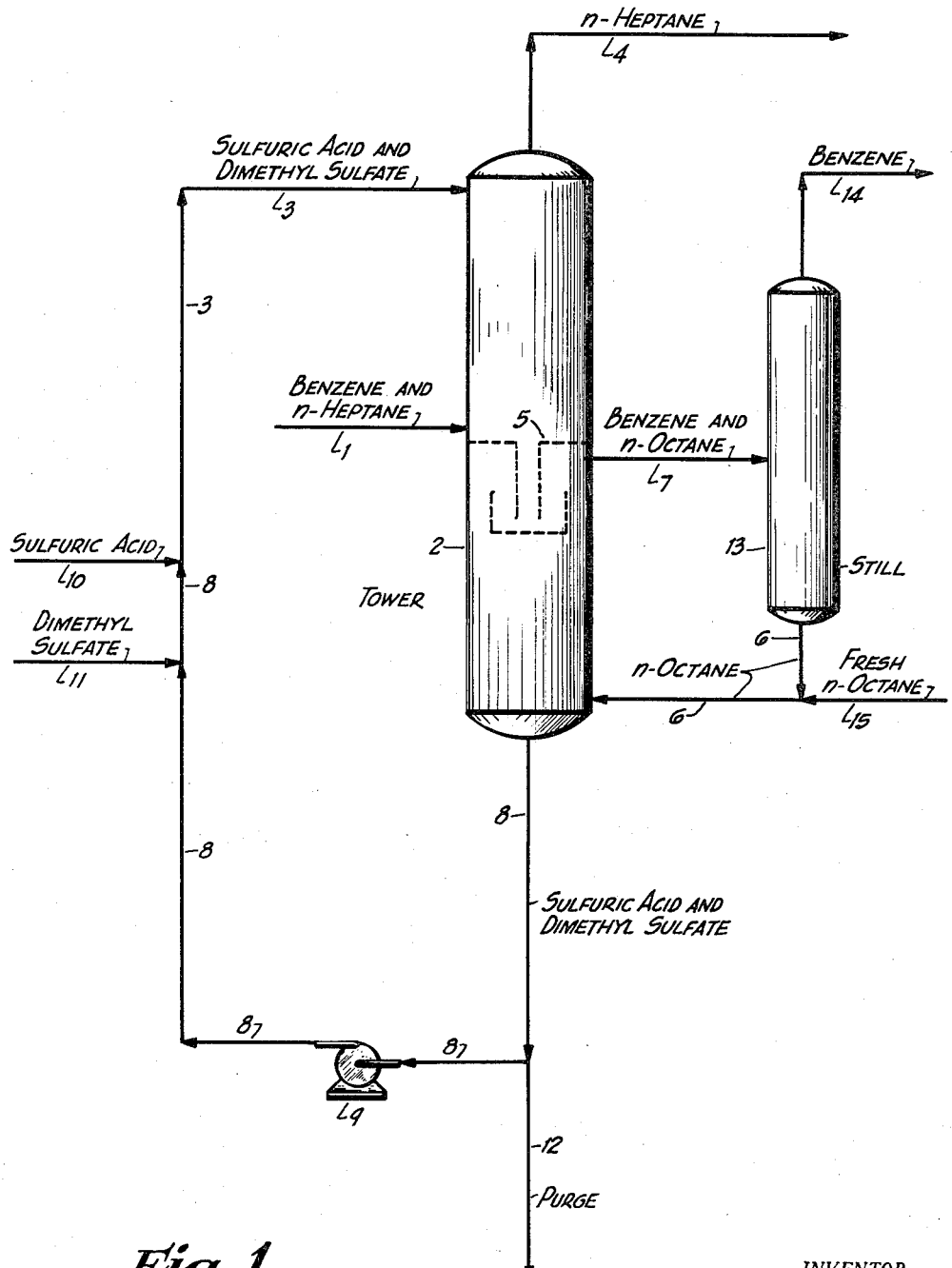

United States Patent Office 2,776,327
Patented Jan. 1, 1957

2,776,327

SOLVENT EXTRACTION OF AROMATIC HYDROCARBONS AND SOLVENT THEREFOR

Alfred W. Francis, Woodbury, N. J., assignor to Socony Mobil Oil Company, Inc., a corporation of New York Application March 19, 1953, Serial No. 343,389

23 Claims. (Cl. 260—674)

This invention relates to extraction with certain selective solvents of various mixtures, and particularly of hydrocarbon mixtures, to separate the mixtures into fractions having different properties.

Numerous processes have been developed for the separation of hydrocarbons and hydrocarbon derivatives of different molecular configuration by taking advantage of their behavior with selective agents. For example, aromatics such as benzene, toluene and xylenes have been separated from hydrocarbon mixtures in which they occur, by adsorption on gels such as silica-alumina composites and the like, by azeotropic distillation, and by solvent extraction. In the last-mentioned field, many solvents have been proposed, such solvents usually dissolving more benzene than heptane. Benzene and heptane are typical representatives of aromatic and nonaromatic hydrocarbons.

Saunders (Ind. Eng. Chem., 43, 121 (1951)) has reported his study of many such solvents. He has rejected several because a moderate amount of aromatic hydrocarbon rendered the solvent miscible with the hydrocarbon mixture. This effect seriously limits the concentration of aromatic hydrocarbon obtainable with such a solvent.

It has been known for some time that dimethyl sulfate [$(H_3C)_2SO_4$, which is commonly referred to as "methyl sulfate"], is relatively selective for aromatic hydrocarbons as opposed to nonaromatic hydrocarbons. This has been described by Pascal et al., Compt. rend. 211, 193 (1940); Ann. chim. appl. 23, 5 (1941); Chem. Abstracts 36, 368, 3120; by applicant in the text, Physical Chemistry of the Hydrocarbons (Farkas, Academic Press; 1950), pages 248 and 267; and by Seidell, Solubilities, Supplementary Volume, pages 1083–1084 (1952). However, dimethyl sulfate is incapable of producing a concentration of benzene higher than about seventy-five percent by weight, because of its moderate miscibility with paraffins, especially when the paraffins are mixed with some aromatics. Similarly, diethyl sulfate or "ethyl sulfate" is still more miscible with hydrocarbons and the maximum concentration of benzene in admixture with heptane of which it is capable of producing by simple extraction is about thirty-seven percent by weight.

It is also well known in the art that sulfuric acid having concentration of about one hundred percent or higher—known as oleum—attacks aromatic hydrocarbons such that sulfonic acids are formed. This behavior has been utilized for exhaustively removing aromatics from hydrocarbon mixtures containing the same and other hydrocarbons. However, the reaction of sulfuric acid with aromatics is not a practical means for recovering aromatics as such except for certain special aromatics of high volume, such as p-xylene, because the sulfonation is not economically reversible. Reversal of the reaction requires dilution of the acid, thus, in turn, requiring acid regeneration. Also, some of the aromatics are consumed in the reaction.

It is an object of this invention to provide an effective means for separating an aromatic hydrocarbon from a mixture containing the same. Another object of this invention is to selectively separate an aromatic hydrocarbon from its mixtures with other hydrocarbons. An important object of this invention is the recovery of said aromatic hydrocarbon from said hydrocarbon mixtures. Other objects and advantages of the invention will be apparent from the following description.

I have now discovered that sulfuric acid and certain dialkyl sulfates can be used together in certain proportions to separate aromatic hydrocarbons from hydrocarbon mixtures containing the same, and that the aromatics and solvents, sulfuric acid and dialkyl sulfates, can be recovered without serious loss to interfering reactions.

Dialkyl sulfates are miscible in all proportions with sulfuric acid of any strength above about eighty-five percent (specific gravity=1.7763), including oleum up to sixty-five percent, which is equivalent to 114.7 percent sulfuric acid specific gravity=1.965), with only a moderate evolution of heat. The relative inertness of dialkyl sulfates as compared with other diluents is due to their fully saturated structure (analogous to ashes). The mixtures of dialkyl sulfate and sulfuric acid contemplated herein retain the miscibility properties of the strong sulfuric acid without having the excessive reactivity of oleum. The dialkyl sulfates contemplated herein contain up to about four carbon atoms per molecule.

Since oleum has a strong affinity for aromatic hydrocarbons such as benzene and toluene, even before actual sulfonation of these hydrocarbons, and since it is immiscible with nonaromatic hydrocarbons, it is extremely selective. Dialkyl sulfates cooperate with oleum to control the latter's reactivity, to decrease its viscosity and to promote contact with the hydrocarbon mixture being treated.

It is preferred that the solvent of this invention contain from about ten to about fifty percent by weight of sulfuric acid and from about ninety to about fifty percent by weight of a dialkyl sulfate, with the sulfuric acid used being about fifteen to about thirty percent oleum (103 to 107 percent sulfuric acid). When the oleum is much stronger than about thirty percent, some irreversible sulfonation of aromatic hydrocarbons takes place, and when the oleum is weaker than about fifteen percent, the aromatic-non-aromatic distribution equilibrium is not favorable. When the solvent contains more than about fifty percent of oleum, the solvent power for benzene is insufficient; and when the solvent contains less than about ten percent of oleum, the selectivity for aromatics is insufficient and some dialkyl sulfate is removed by the co-solvent, as explained hereinbelow. A solvent containing about thirty-five percent of oleum (103 to 107 percent $H_2SO_4$) and about sixty-five percent of dialkyl sulfate, is optimum herein.

I have found that the oleum-dimethyl sulfate solvent mixtures of this invention make possible recovery of benzene concentrates having a maximum concentration of about 91.4 percent by weight, in contrast to 75 percent with dimethyl sulfate as the sole solvent. Still higher concentrations, up to one hundred percent, can be obtained directly, however, by modifying the solvent with a small quantity, from about one to about twenty and preferably about five percent by weight of the solvent, of a substance unreactive to oleum and immiscible with benzene. Alkane sulfonic acids, having from one to about three carbon atoms per molecule, aromatic sulfonic acids and inorganic sulfates, are satisfactory for this purpose. Typical alkane sulfonic acids are methane sulfonic acid, ethane sulfonic acid, propane sulfonic acid. Typical aromatic sulfonic acids are benzene sulfonic acid and toluene sulfonic acid. Typical inorganic sulfates are sodium bisulfate, potassium bisulfate and the corresponding sulfates. Especially advantageous herein are methane sulfonic acid, benzene sulfonic acid, and sodium bisulfate.

In the case of aromatic sulfonic acids, instead of introducing them as such, they can be formed in the process by allowing a moderate degree of sulfonation of the aromatic hydrocarbon being extracted by the oleum of the solvent.

The solvents of this invention are used to extract an aromatic hydrocarbon from a suitable hydrocarbon mixture containing the same, in the following manner. The hydrocarbon mixture is contacted with a solvent mixture of sulfuric acid and dialkyl sulfate, whereupon are formed an extract comprising said aromatic, sulfuric acid and dialkyl sulfate and a raffinate comprising other hydrocarbons of the original hydrocarbon mixture; separating the extract and raffinate; and contacting the extract with a secondary solvent comprising a non-aromatic hydrocarbon of the character defined hereinbelow, whereupon are formed a second extract comprising said aromatic hydrocarbon and said secondary solvent and a second raffinate comprising sulfuric acid and dialkyl sulfate; separating the second extract and the second raffinate; and distilling the second extract to recover the aromatic hydrocarbon, either as such or in the form of an aromatic concentrate.

In order that the invention may be more readily understood, reference is now made to Figure 1 which represents a typical flow sheet of the process.

In Figure 1, a mixture of benzene (boiling point 80.1° C.) and of n-heptane (boiling point, 98.4° C.) is charged from line 1 to a central section of tower 2. The tower is operated at a temperature of about 0° C. and substantially atmospheric pressure. A mixture comprising about sixty-five percent by weight of dimethyl sulfate and thirty-five percent by weight of oleum (107° $H_2SO_4$), is fed from line 3 into an upper section of tower 2. Thus the hydrocarbon mixture and the sulfuric acid-dimethyl sulfate mixture are in countercurrent contact in the upper portion of the tower. n-Heptane is unaffected by such contact and flows upwardly through the tower and is withdrawn as liquid through line 4. Benzene, however, becomes associated with sulfuric acid and dimethyl sulfate, and the resulting mixture flows downwardly through liquid seal 5 to the lower portion of the tower. This seal is substantially like an inverted bubble cap. It permits free flow of heavy liquid downward through it, but prevents upward flow of light liquid.

A secondary solvent, n-octane, is introduced into a lower section of the tower through line 6, and is in countercurrent contact with the downwardly flowing mixture of benzene, dimethyl sulfate and sulfuric acid. n-Octane removes the benzene from the latter mixture and the n-octane-benzene mixture so formed is removed from the tower through line 7. A mixture of sulfuric acid and dimethyl sulfate is withdrawn from the bottom of the tower through line 8 and is recycled to line 3 by means of pump 9 in line 8. Make-up sulfuric acid and make-up dimethyl sulfate can be added to the system via lines 10 and 11, respectively, as needed.

Under certain conditions of operation some sulfonation of the aromatic hydrocarbon can occur, so that it is not all capable of re-extraction with the secondary solvent. It can form some sulfonic acid, as indicated above. Moderate amounts of sulfonic acid do not affect the extraction adversely, except for consumption of reagents, but actually improve the efficiency by providing higher purity aromatic hydrocarbon in the extract. However, to avoid excessive accumulation of sulfonic acids, a portion of the acid mixture can be purged via line 12 before being recycled to the extractor. The purged material can be treated to recover valuable by-products therefrom, or it can be discarded if it is too small in amount to justify such treatment.

The benzene-n-octane mixture in line 7 is fed to still or distillation column 13, from which benzene (boiling point, 80.1° C.) is taken as an overhead product through line 14 and from which n-octane (boiling point, 125.6° C.) is taken as a bottoms product through line 6. Make-up or fresh n-octane can be added to line 6 via inlet pipe 15. If the secondary solvent is lower boiling than the benzene, as is n-pentane (boiling point, 36° C.), it will be taken overhead as distillate and recycled to the extractor, and the benzene will be removed as bottoms from still 13.

As indicated by the foregoing illustration, benzene can be recovered by re-extraction with a cosolvent or secondary solvent, such as n-octane. The secondary solvent is a compound inert to sulfuric acid and substantially immiscible with dimethyl sulfate. The solubility of dimethyl sulfate from the recommended mixture (65% dimethyl sulfate–35% oleum (107% $H_2SO_4$)) is only about 0.2 percent by weight in n-pentane or n-octane. Further low viscosity in the secondary solvent is desirable. In general, therefore, the secondary solvent is a paraffin having a boiling point substantially higher or substantially lower than the boiling point of the aromatic hydrocarbon separated from the original mixture. Or, in another sense, the paraffin used as a secondary solvent is one having at least one carbon atom per molecule greater or one carbon atom less than the total carbon atoms of the aromatic hydrocarbons separated from the original mixture. The paraffins have from five to thirteen carbon atoms per molecule, typical of which are: pentanes, hexanes, heptanes, octanes, nonanes, decanes. Thus, n-pentane and n-octane are suitable for re-extracting benzene; similarly, n-pentane, n-hexane and n-decane are suitable for re-extracting xylenes. It will be apparent, therefore, that 2, 2-dimethyl pentane (boiling point, 79.3° C.) should not be used for re-extracting benzene (boiling point, 80.1° C.).

A non-hydrocarbon solvent such as carbon disulfide, methanol, etc. will usually be unsatisfactory as a secondary solvent because it is either miscible with dimethyl sulfate or reactive with oleum or both.

Other means are available for recovering benzene or other aromatic hydrocarbon dissolved in the solvent comprising dimethyl sulfate and sulfuric acid. For example, the aromatic hydrocarbon can be recovered by vacuum distillation of the aromatic-dimethyl sulfate-sulfuric acid mixture. However, in order to avoid substantial sulfonation of the aromatic, it is preferred to avoid heating or extended contact of the aromatic with the solvent, and to resort to the above-described re-extraction with a secondary solvent.

The solvents described herein are suitable for extracting any aromatic hydrocarbon, monocyclic and polycyclic, from a mixture of the same and a paraffin and/or a naphthene. Olefins, unsaturated naphthenes, or bases such as pyridine or quinoline, in the hydrocarbon mixture react with the solvent, and if present in the hydrocarbon mixture should be removed in a pre-treatment. For example, olefins can be removed by a conventional light acid ($H_2SO_4$) treatment, which is inoperative for aromatics. Olefins can also be separated from an olefin-paraffin-aromatic mixture by the procedure described in my related application Serial No. 343,387, filed March 19, 1953, namely, by treatment with a mixture of sulfuric acid (90 to 95% $H_2SO_4$) and dimethyl sulfate; in this treatment paraffins and aromatics are rejected. Then, the aromatics can be extracted from the remaining aromatic-paraffin mixture with the solution described herein. As pointed out in said related application Serial No. 343,387, organic compounds containing hydroxyl, amino, aldehydo and/or keto groups are unsuited as organic diluents for the procedure described therein. Such compounds react with sulfuric acid, evolving a large amount of heat and altering its properties greatly. This is consistent with the practice of this invention since, as mentioned above, methanol and the like are unsatisfactory as secondary solvents.

The hydrocarbon mixture can contain as little as about one percent or as much as eighty percent by weight of aromatic hydrocarbon. Thus, the solvent of this invention is much more selective for aromatics than previously described solvents.

With regard to operating conditions during both extractions, it is recommended that the temperature should be as low as practicable. Nonetheless, it should not be below about —40° C., at which temperature the reagents (sulfuric acid and dimethyl sulfate) begin to freeze. The temperature should not exceed about +50° C., for at such a temperature some sulfonation is initiated. Preferably, then, the temperature should fall within the range of about 0° C. to about 25° C. There is no requirement of superatmospheric pressure.

The quantities of solvent, sulfuric acid-dimethyl sulfate, used in the initial extraction are determined by the aromatic concentration of the hydrocarbon mixture being treated and the efficiency of separation desired. The amount of sulfuric acid in the mixed solvent should be at least equivalent to the aromatic hydrocarbon contained in the hydrocarbon mixture. In the case of benzene there should be at least about 1.25 parts of acid by weight to one part of benzene.

Correspondingly, the quantity of secondary solvent used in the second extraction is dependent upon the quantity of aromatic extracted by the initial solvent.

As a guide, several typical examples are described below, in which all parts are by weight unless otherwise specified.

The invention is further illustrated by experimental data obtained with dimethyl sulfate and diethyl sulfate and with solvents contemplated herein. These experimental data, obtained at 25° C. and atmospheric pressure, are presented in the form of Tables I to V and charts, or more particularly ternary diagrams, identified here as Figures 2 through 5. These diagrams can be used to determine: the suitability of a solvent for a desired separation; the approximate selectivity of the solvent; the range of composition of the solvent and the mixture to be treated; the aproximate number of stages or extractions necessary to effect a separation of desired degree; etc. The benzene dissolved in the solvent (sulfuric acid-dimethyl sulfate, etc.) in each instance was recovered quantitatively by re-extraction with n-pentane.

Figure 2:
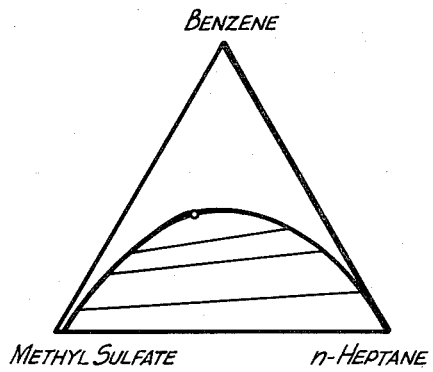

Table I and Figure 2 represent the system; benzene, dimethyl sulfate and n-heptane.

Figure 3:
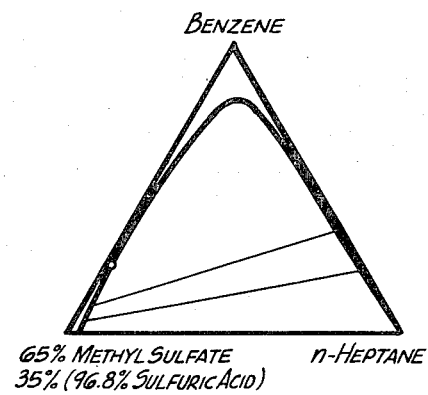

Table IIa and Figure 3 represent the system: benzene, 65% dimethyl sulfate–35% sulfuric acid (96.8% $H_2SO_4$) and n-heptane.

Figure 4:
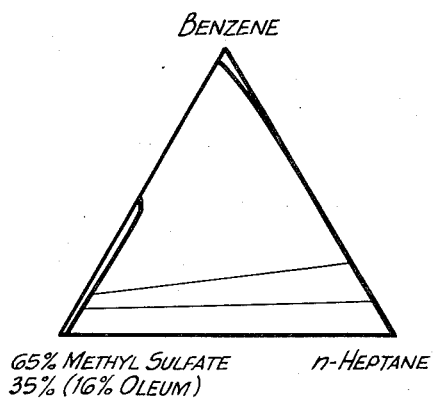

Table IIb and Figure 4 represent the system: benzene, 65% dimethyl sulfate–35% (16% oleum or 103.6% $H_2SO_4$), density 1.8756 and n-heptane.

Figure 5:
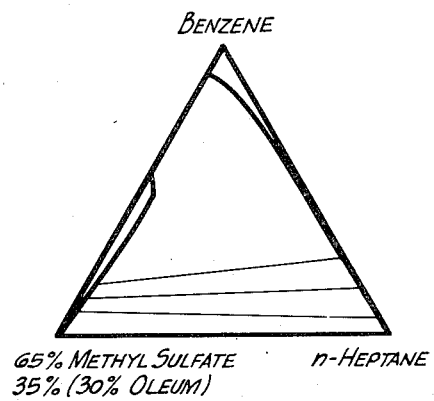

Table IIc and Figure 5 represent the system: benzene, 65% dimethyl sulfate–35% (30% oleum or 106.75% $H_2SO_4$), density 1.928 and n-heptane.

Referring now to Table I and Figure 2, it will be seen that dimethyl sulfate has a moderate miscibility with n-heptane. Moreover, the tie lines slope down toward the left, indicating only a moderate selectivity for aromatics;

in this respect, dimethyl sulfate is similar to all conventional solvents moderately selective for aromatics.

Referring next to Table IIa and Figure 3, a mixture of dimethyl sulfate and 96.8% sulfuric acid has a substantially lower miscibility with n-heptane than has dimethyl sulfate alone. However, the equilibrium distribution is much less favorable and the recovery of benzene is even less efficient than in Table I and Figure 2. This is due to the immiscibility of benzene with 96.8% sulfuric acid which in effect "salts" it out of mixtures with dimethyl sulfate.

Table IIb and Figure 4 reveal that oleum (103.6% $H_2SO_4$) co-operates with dimethyl sulfate to provide a high degree of selectivity for benzene. The recovery of the benzene and its concentration in the solvent free extract are both improved considerably as compared with the extraction with dimethyl sulfate alone or with 96.8% sulfuric acid.

Table IIc and Figure 5 reveal that stronger oleum (106.75 $H_2SO_4$) in combination with dimethyl sulfate, has an even greater selectivity for benzene. Surprisingly, the lower tie lines, in Figure 5, slope down toward the right, indicating greatly increased selectivity for aromatics; this orientation is new, for no such relationship has been published heretofore for any solvent-aromatic-paraffin system. The reversal in slope of tie lines noted in this figure is called a "solutrope" in other systems in recent literature (Ind. Eng. Chem. 42, 1206 (1950)). In addition, Figure 5 demonstrates that, with constant oleum concentration, selectivity for benzene is highest at low concentrations of benzene in the hydrocarbon charge mixture. Here again, this relationship is different from that involved in other solvent-aromatic-paraffin systems. The benzene recovery and its concentration in the solvent free extract are still further improved as compared with Table IIb and Figure 4.

TABLE I

Single stage extraction of benzene at 25° C. with methyl sulfate (Figure 2). All figures in wt. percent.

| | | | |
|---|---|---|---|
| Weight Ratio, Solvent/Hydrocarbon | 0.79 | 0.42 | 0.39 |
| Benzene in Hydrocarbon Charge | 20.5 | 34 | 43.5 |
| Benzene in Layers: | | | |
| Extract | 9.5 | 22 | 25 |
| Raffinate | 13 | 25 | 35 |
| Benzene in Sol. Free: | | | |
| Extract | 73 | 76 | 71.5 |
| Raffinate | 13 | 26 | 37 |
| Benzene Recovery in Extract | 42 | 35 | 29 |

TABLE II

Single stage extraction of benzene at 25° C. with mixtures of 65% methyl sulfate and 35% sulfuric acid or oleum (all figures in wt. percent).

| | | | |
|---|---|---|---|
| (a) 96.8% Sulfuric Acid (Figure 3): | | | |
| Weight Ratio Solvent/Hydrocarbon | 1.34 | 1.05 | |
| Benzene in Hydrocarbon Charge | 20.5 | 34 | |
| Benzene in Layers: | | | |
| Extract | 2 | 3.4 | |
| Raffinate | 18.5 | 31 | |
| Benzene in Solvent Free: | | | |
| Extract | 59 | 76 | |
| Raffinate | 18.5 | 31 | |
| Benzene Recovery in Extract | 13 | 11 | |
| (b) 16% Oleum or 103.6% Sulfuric Acid (Figure 4): | | | |
| Weight Ratio Solvent/Hydrocarbon | 1.74 | 1.41 | |
| Benzene in Hydrocarbon Charge | 20.5 | 34 | |
| Benzene in Layers: | | | |
| Extract | 6 | 9 | |
| Raffinate | 10 | 23 | |
| Benzene in Solvent Free: | | | |
| Extract | 83 | 87.4 | |
| Raffinate | 10 | 23 | |
| Benzene Recovery in Extract | 55 | 41.5 | |
| (c) 30% Oleum or 106.75% Sulfuric Acid (Figure 5): | | | |
| Weight Ratio Solvent/Hydrocarbon | 1.74 | 1.44 | 1.22 |
| Benzene in Hydrocarbon Charge | 20.5 | 34 | 43.5 |
| Benzene in Layers: | | | |
| Extract | 8.4 | 12.2 | 14.9 |
| Raffinate | 5.2 | 17.3 | 27.9 |
| Benzene in Solvent Free: | | | |
| Extract | 87.5 | 91 | 91.4 |
| Raffinate | 5.2 | 17.3 | 27.9 |
| Benzene Recovery in Extract | 79 | 59.5 | 50 |

TABLE III

Single stage extraction of Benzene at 25° C. with mixtures of 65% diethyl sulfate and 35% oleum (all figures in wt. percent).

| | | |
|---|---|---|
| (a) 16% Oleum or 103.6% Sulfuric Acid: | | |
| Weight Ratio Solvent/Hydrocarbon | 1.26 | |
| Benzene in Hydrocarbon Charge | 20.5 | |
| Benzene in Layers: | | |
| Extract | 8.5 | |
| Raffinate | 9.5 | |
| Benzene in Solvent Free: | | |
| Extract | 80.6 | |
| Raffinate | 9.5 | |
| Benzene Recovery in Extract | 59.3 | |
| (b) 30% Oleum or 106.75% Sulfuric Acid: | | |
| Weight Ratio Solvent/Hydrocarbon | 1.27 | 2.06 |
| Benzene in Hydrocarbon Charge | 20.5 | 34 |
| Benzene in Layers: | | |
| Extract | 10 | 11.5 |
| Raffinate | 7.4 | 10.5 |
| Benzene in Solvent Free: | | |
| Extract | 88 | 82.5 |
| Raffinate | 7.4 | 10 |
| Benzene Recovery in Extract | 70 | 80.5 |

Table III shows that although diethyl sulfate alone is much too miscible with paraffin hydrocarbons for satisfactory extractions of aromatics therefrom, the presence of the oleum salts out the paraffin hydrocarbon and gives a highly selective extraction.

TABLE IV

Single stage extraction of toluene at 25° C. with mixtures of 65% dimethyl sulfate and 35% oleum (all figures in wt. percent).

| | | |
|---|---|---|
| (a) 16% Oleum or 103.6% Sulfuric Acid: | | |
| Weight Ratio Solvent/Hydrocarbon | 1.37 | 1.14 |
| Toluene in Hydrocarbon Charge | 20.2 | 33.6 |
| Toluene in Layers: | | |
| Extract | 8.6 | 11.8 |
| Raffinate | 8.2 | 20.9 |
| Toluene in Solvent Free: | | |
| Extract | 88.0 | 99.7 |
| Raffinate | 8.2 | 20.9 |
| Toluene Recovery | 64.4 | 46.2 |
| (b) 30% Oleum or 106.75% Sulfuric Acid: | | |
| Weight Ratio Solvent/Hydrocarbon | 1.38 | 1.15 |
| Toluene in Hydrocarbon Charge | 20.2 | 33.6 |
| Toluene in Layers: | | |
| Extract | 10.8 | 15.6 |
| Raffinate | 4.2 | 15.1 |
| Toluene in Solvent Free: | | |
| Extract | 86.2 | 92.1 |
| Raffinate | 4.2 | 15.1 |
| Toluene Recovery | 83 | 64.5 |

Table IV shows that extraction of toluene is accomplished as readily and as efficiently as is benzene.

TABLE V

Single stage extraction of benzene at 25° C. with mixtures of 65% dimethyl sulfate, 30% of 16% oleum and 5% of another substance.

| Other Substance | Ethane Sulfonic Acid | Sodium Bisulfate |
|---|---|---|
| Weight Ratio, Solvent to Hydrocarbon | 1.37 | 1.37 |
| Benzene in Hydrocarbon Charge | 20.5 | 20.5 |
| Benzene in Layers: | | |
| Extract | 8.9 | 9.0 |
| Raffinate | 8.0 | 7.15 |
| Benzene in Solvent Free: | | |
| Extract | 99+ | 99+ |
| Raffinate | 8.0 | 7.15 |
| Benzene Recovery in Extract | 66 | 69 |

Table V shows that the presence of small amounts of materials immiscible with benzene and inert to oleum increases the maximum concentration of aromatic obtainable in the solvent free extract.

I claim:

1. A solution characterized by a high selectivity for aromatic hydrocarbons as opposed to saturated hydrocarbons, consisting essentially of: from about ten to about fifty per cent by weight of sulfuric acid and from about ninety to about fifty percent by weight of a dialkyl sulfate, the sulfuric acid thereof having a concentration from about 103 to about 107 percent sulfuric acid and said dialkyl sulfate containing up to about four carbon atoms per molecule.

2. The solution defined by claim 1 wherein the dialkyl sulfate is dimethyl sulfate.

3. The solution defined by claim 1 wherein the acid has a concentration of about 107 percent sulfuric acid.

4. A solution characterized by a high selectivity for aromatic hydrocarbons as opposed to saturated hydrocarbons, consisting essentially of: about thirty-five percent by weight of sulfuric acid and about sixty-five percent by weight of a dialkyl sulfate, the sulfuric acid thereof having a concentration from about 103 to about 107 percent sulfuric acid, and said dialkyl sulfate containing up to about four carbon atoms per molecule.

5. A solution characterized by a high selectivity for aromatic hydrocarbons as opposed to saturated non-aromatic hydrocarbons, which comprises: from about ten to about fifty percent by weight of sulfuric acid, said acid having a concentration from about 103 to about 107 percent sulfuric acid, from about seventy to about forty-five percent by weight of a dialkyl sulfate containing up to about four carbon atoms per molecule, and from about twenty to about five percent by weight of a modifying compound selected from the group consisting of an aromatic sulfonic acid, an alkane sulfonic acid containing from one to about three carbon atoms per molecule, an inorganic sulfate and an inorganic bisulfate.

6. The solution defined by claim 5 wherein said modifying compound is ethane sulfonic acid.

7. The solution defined by claim 5 wherein said modifying compound is sodium bisulfate.

8. The process for separating an aromatic hydrocarbon from a hydrocarbon mixture consisting of at least one aromatic hydrocarbon and at least one saturated hydrocarbon, which comprises: contacting said mixture, at a temperature between about −40° C. and about +50° C., with a solution consisting essentially of from about ten to about fifty percent by weight of sulfuric acid and from about ninety to about fifty percent by weight of a dialkyl sulfate, the sulfuric acid thereof having a concentration from about 103 to about 107 percent sulfuric acid, and said dialkyl sulfate containing up to about four carbon atoms per molecule, whereupon said aromatic hydrocarbon is preferentially extracted from said hydrocarbon mixture.

9. The process defined by claim 8 wherein the dialkyl sulfate is dimethyl sulfate.

10. The process defined by claim 8 wherein the acid has a concentration of about 107 percent sulfuric acid.

11. The process defined by claim 8 wherein said solution consists essentially of about thirty-five percent by weight of sulfuric acid, having a concentration from about 103 to about 107 percent sulfuric acid, and about sixty-five percent by weight of dimethyl sulfate.

12. The process for separating an aromatic hydrocarbon from a hydrocarbon mixture consisting of at least one aromatic hydrocarbon and at least one saturated hydrocarbon which comprises: contacting said mixture, at a temperature between −40° C. and about +50° C., with a solution comprising from about ten to about fifty percent by weight of sulfuric acid, said acid having a concentration from about 103 to about 107 percent sulfuric acid, from about seventy to about forty-five percent by weight of a dialkyl sulfate containing up to about four carbon atoms per molecule and from about twenty to about five percent by weight of a modifying compound selected from the group consisting of an aromatic sulfonic acid, an alkane sulfonic acid containing from one to about three carbon atoms per molecule, an inorganic sulfate and an inorganic bisulfate, whereupon said aromatic hydrocarbon is preferentially extracted from said hydrocarbon mixture.

13. The process defined by claim 12 wherein said modifying compound is ethane sulfonic acid.

14. The process defined by claim 12 wherein said modifying compound is sodium bisulfate.

15. The process for recovering an aromatic hydrocarbon from a hydrocarbon mixture consisting of at least one aromatic hydrocarbon and at least one saturated hydrocarbon, which comprises: contacting said mixture, at a temperature between about −40° C. and about +50° C., with a solution consisting essentially of about ten to about fifty percent by weight of sulfuric acid and from about ninety to about fifty percent by weight of a dialkyl sulfate containing up to about four carbon atoms per molecule, the sulfuric acid thereof having a concentration from about 103 to about 107 percent sulfuric acid, whereupon said aromatic hydrocarbon is preferentially extracted from said hydrocarbon mixture, and whereupon are formed an extract phase and a raffinate phase, the extract phase comprising said aromatic hydrocarbon, sulfuric acid and dialkyl sulfate and the raffinate phase comprising said saturated hydrocarbon; separating said extract and said raffinate; contacting said extract, at a temperature between about −40° C. and about +50° C., with a secondary solvent comprising a paraffin having from about four to about thirteen carbon atoms per molecule, the difference in the number of carbon atoms of said paraffin and said aromatic being at least one, whereupon are formed a second extract comprising said aromatic and said paraffin and a second raffinate comprising sulfuric acid and dialkyl sulfate; separating said second extract and said second raffinate; and distilling said second extract and recovering said aromatic therefrom.

16. The process defined by claim 15 wherein the dialkyl sulfate is dimethyl sulfate.

17. The process defined by claim 15 wherein the acid has a concentration of about 107 percent sulfuric acid.

18. The process defined by claim 15 wherein said solution consists essentially of about thirty-five percent by weight of sulfuric acid, having a concentration from about 103 to about 107 percent sulfuric acid, and about sixty-five percent by weight of dimethyl sulfate.

19. The process for recovering an aromatic hydrocarbon from a hydrocarbon mixture consisting of at least one aromatic hydrocarbon and at least one saturated hydrocarbon, which comprises: contacting said mixture, at a temperature between about −40° C. and about +50° C., with a solution consisting of from about ten to about fifty percent by weight of sulfuric acid and from about ninety to about fifty percent by weight of a dialkyl sulfate containing up to about four carbon atoms per molecule, the sulfuric acid thereof having a concentration from about 103 to about 107 percent sulfuric acid, whereupon said aromatic hydrocarbon is preferentially extracted from said hydrocarbon mixture, and whereupon are formed an extract phase and a raffinate phase, the extract phase comprising said aromatic hydrocarbon, sulfuric acid and dialkyl sulfate and the raffinate phase comprising said saturated hydrocarbon; separating said extract and said raffinate; and vacuum distilling said extract to recover said aromatic hydrocarbon.

20. The process for recovering an aromatic hydrocarbon from a hydrocarbon mixture consisting of at least one aromatic hydrocarbon and at least one saturated hydrocarbon, which comprises: contacting said mixture at a temperature between about −40° C. and about +50° C., with a solution comprising from about ten to about fifty percent by weight of sulfuric acid, said acid having a concentration from about 103 to about 107 percent sulfuric acid, from about seventy to about forty-five percent by weight of a dialkyl sulfate containing up to about four carbon atoms per molecule, and from about twenty to about five percent by weight of a modifying compound selected from the group consisting of an aromatic sulfonic acid, an alkane sulfonic acid containing from one to about three carbon atoms per molecule, an inorganic sulfate and an inorganic bisulfate, whereupon said aromatic hydrocarbon is preferentiallly extracted from said hydrocarbon mixture, and whereupon are formed an extract phase and a raffinate phase, the extract phase comprising said aromatic hydrocarbon, sulfuric acid, dialkyl sulfate and said modifying compound, and the extract phase comprising said other hydrocarbon; separating said extract and said raffinate; and recovering said aromatic hydrocarbon from said extract phase.

21. The process defined by claim 20 wherein said modifying compound is ethane sulfonic acid.

22. The process defined by claim 20 wherein said modifying compound is sodium bisulfate.

23. The process for separating an olefin and an aromatic hydrocarbon from a hydrocarbon mixture containing the same and at least one saturated hydrocarbon, which comprises: contacting said mixture, at a temperature between about −40° C. and about +25° C., with a solution consisting essentially of about ten to about forty percent by weight of sulfuric acid, having a concentration from about ninety to about ninety-five percent of sulfuric acid, and from about ninety to about sixty percent by weight of dimethyl sulfate, whereupon are formed an extract phase comprising said olefin, sulfuric acid and dimethyl sulfate and a raffinate phase comprising the remainder of said hydrocarbon mixture; separating said extract phase and extracting said raffinate phase with a solution consisting essentially of from about ten to about fifty percent by weight of sulfuric acid, having a concentration from about 103 to about 107 percent, and from about ninety to about fifty percent by weight of dimethyl sulfate, whereupon are formed a second extract phase comprising said aromatic hydrocarbon, sulfuric acid and dimethyl sulfate and a second raffinate phase comprising said saturated hydrocarbon; and separating said second extract and said second raffinate.

References Cited in the file of this patent

UNITED STATES PATENTS

| 1,484,249 | Bader | Feb. 19, 1924 |
| 2,096,879 | Brooks | Oct. 26, 1937 |
| 2,114,524 | Egli | Apr. 19, 1938 |
| 2,143,890 | Liberthson | Jan. 17, 1939 |
| 2,248,496 | Forney | July 8, 1941 |
| 2,403,972 | Friedman | July 16, 1946 |
| 2,572,583 | Antle | Oct. 23, 1951 |

OTHER REFERENCES

Richter, Organic Chemistry, vol. 1, page 167. Nordeman Publishing Co., N. Y. (1944).